Feb. 8, 1944. J. S. NACHTMAN 2,341,157
ELECTROPLATING APPARATUS
Filed Jan. 16, 1939 8 Sheets-Sheet 2

Fig. 3.

Inventor:
John S. Nachtman
By Clarence P. Byrnes
Attorney

Feb. 8, 1944.   J. S. NACHTMAN   2,341,157
ELECTROPLATING APPARATUS
Filed Jan. 16, 1939   8 Sheets-Sheet 3

Inventor:
John S. Nachtman
By Clarence P. Byrnes
Attorney

Feb. 8, 1944.　　　J. S. NACHTMAN　　　2,341,157
ELECTROPLATING APPARATUS
Filed Jan. 16, 1939　　　8 Sheets-Sheet 8

INVENTOR
John S. Nachtman
By Clarence P. Ayres
his Attorney

Patented Feb. 8, 1944

2,341,157

UNITED STATES PATENT OFFICE 2,341,157

ELECTROPLATING APPARATUS

John S. Nachtman, Beaver, Pa.

Application January 16, 1939, Serial No. 251,065

7 Claims. (Cl. 204—211)

This invention relates to electro-baths, and particularly, to the handling of strip material while subjecting it to an electro-treating process, such as electro-plating. I have particular reference to suitable apparatus for continuously electroplating or treating metal strip and the like.

I have found that there are many difficulties encountered in providing a suitable arrangement for the purposes enumerated. In electro-treatment, the strip will constitute one of the electrodes (in plating, the cathode) and other means will constitute the other electrode (in plating, the anode).

The apparatus of the prior art possesses the following serious disadvantages which have made it impractical to produce a uniformly high grade product by a continuous operation:

(a) In continuous plating operations, high current densities per unit of surface being plated must be employed to expeditiously deposit coatings of desired thickness; and, great lengths of strip must be subjected to the plating operation for comparatively long periods of time. The length of strip being subjected to the plating operation at any one instant may in practice, be several hundred feet. In order to plate such a length of sheet while in motion, the strip being the cathode, it is necessary to establish electric contact with it at a number of points spaced along its length. This is usually done by reeving the sheet over two sets of rolls, an upper set and a lower set, contact for the plating current being made through the upper set of rolls, over which the sheet passes. With this arrangement it is difficult to obtain a good electrical connection between contact rolls and the metal strip, especially after the strip has been partially plated. The strip passes approximately half-way around the contact roll or rolls (upper set), and as it is wet with the electrolyte, the current, in going from the roll to the strip, must pass through a thin film of electrolyte. This causes deposition of metal on the roll instead of the strip, and may even remove plated metal from the strip while passing over the roll. This is undesirable as it is detrimental to the apparatus and makes it impossible to obtain a high grade product.

(b) Pulling the strip from one end thereof over a number of rolls subjects it to high flexing and tensional stresses. This is true even if the rolls are turned without friction, but as the current is conducted to the rolls through a slip ring or brush system, which increases the resistance to turning of the rolls, the strip tension is of considerable magnitude. If the rolls must be turned by friction with the strip, slip of strip where it makes contact with the rolls may occur. Any such slip may damage the plating, especially in the initial stages, where the plating is very thin, and may not have completely covered the base stock of the strip.

(c) The contact rolls themselves are particularly weak portions of such an apparatus and are a constant source of trouble because of limitations in material available for their construction. Those that are made of material which possesses good electrical properties and have sufficient mechanical strength to withstand the stresses to which they are subjected in carrying the strip usually are subject to corrosion by the electrolytes; whereas those that are constructed of good corrosion resisting materials such as carbon and some cast alloys are usually not good conductors and do not possess sufficient mechanical strength to withstand the stresses in carrying the strip.

(d) Also, serious difficulties are experienced in making electrical contact between rotating contact rolls over which the strip passes, as heretofore constructed, and the stationary current-supplying brushes because the contact surfaces are exposed to the electroplating solution. This causes a loss in voltage which results in excessive heating and other contact ills. This condition is further aggravated because many of the most desirable solutions in use today react electrolytically with the brushes.

(e) Because the strip is not perfectly straight (i. e., possesses "camber"), it undergoes a lateral sliding motion as it passes over the various rolls and contacts the walls of the plating tank and other parts of the apparatus, resulting in damage thereto. Since the anodes are located in a predetermined central position in the plating tank, this sidewise shifting of the strip results in the deposition of a non-uniform electro-deposit on the strip.

(f) In the previously known machines, the submerged rolls also are a source of trouble, because their bearings are immersed in the electrolyte and, in many instances, have been corroded by the electrolyte and rendered unfit for further service; moreover, the joint between the tank wall and roll shaft is a source of frequent leakage.

It is, accordingly, an object of my invention to provide a solution of the difficulties and problems previously presented.

Another object has been the provision of a commercially practical apparatus embodying such a solution and overcoming the difficulties previously presented.

Another object of the invention has been the provision of apparatus for continuously electroplating strip material that will efficiently and uniformly conduct electroplating currents thereto at several regions throughout its length as the strip passes through the bath or baths, with a minimum of resistance and without plating the rolls.

A further important object of the invention is the provision of an improved apparatus for electroplating strip material continuously that employs a plurality of rolls, driven at a suitable synchronous peripheral speed for gripping the strip at spaced points throughout its length and smoothly propelling the strip through the electroplating steps without subjecting the strip to tensional or twisting forces.

A further object is to provide a novel contact roll construction for use in electroplating or electrochemical processing apparatus and which embodies a totally enclosed current-conducting mechanism which is not contaminated by the electrobath solution.

A still further object is to provide a hollow contact roll for use in electroplating apparatus for strip material which embodies internal brush means contacting an inner surface of said roll at a region in proximity to the point of contact of the strip material with the outer surface of the roll, whereby the path of current through the wall of the roll is of minimum length and the brush pressure counteracts the pressure against the outer surface of the roll. Also, it is an object to provide an electroplating apparatus embodying novel submerged roll constructions which are efficient, durable and not harmfully affected even by the most corrosive electrolytes.

In one aspect, my invention deals with electroplating apparatus for strip material that will automatically center the strip in its passage through the bath and prevent it from contacting the sides of the electro-tank.

I also provide other improved features, for example, I preferably circulate the electrolyte in such a manner as to maintain substantially uniform electrolytic composition adjacent the anodes and utilize a part of the electrolyte to flush the strip above the bath level and free it of adhering extraneous material as it emerges from the bath; this insures complete wetting of the strip to avoid bubble formation as it enters the bath; the anodes are preferably so grouped with respect to the strip material that the electroplating current may be selectively varied to effect a greater electro-deposition on one surface of the strip than the other.

These and many other objects of my invention will appear to those skilled in the art from the drawings, the description, and the appended claims.

Although for the purpose of illustration, I particularly refer to electroplating operations, it should be understood that many of the novel features of this invention are equally applicable to electro-pickling and other types of electrobath treating operations.

With continued reference to the drawings, wherein like reference characters have been used to designate like parts throughout the several views thereof, the apparatus comprises a tank or container T through which the strip material S is fed in a sinuous path. The strip material is reeved over and under, respectively, a series of upper rolls 25 and 26 and lower rolls R. The rolls R are submerged in the solution, but the rolls 25 and 26 are above the surface of the solution. Above the sheet where it passes over each roll 26, is a contact roll 25, by means of which electrical contact for the plating current is made with the strip, instead of through roll 26, as in the practice usually followed hitherto. The rolls 25 are preferably driven at the same peripherical speed so as to propel the strip smoothly through the bath. As the strip emerges from the bath for the last time, it passes through a squeegee assembly Q for removing the adhering electrolyte therefrom. An anode electroplating current is applied to a plurality of anodes A which are suspended in the bath between the vertical reaches of strip S. The electrolyte is continuously circulated, preferably, by removing a portion of it from tank T, filtering it, passing it through a heat exchanger (for imparting heat thereto or dissipating heat therefrom, as the case may be, for securing the requisite electroplating temperature), and returning it to tank T at a point remote from the removal point. The electrolyte is returned to the electroplating tank in such manner as to continuously agitate the body of electrolyte in the tank adjacent the anodes and also to flush strip S above the level of the electrolyte for dislodging adhering extraneous matter, both as it is entering and emerging from the electrolyte.

Tank and support construction

Tank T is generally rectangular in form and comprises side walls 10, a bottom 11, and end walls 12. For the purpose of simplifying the illustration of the invention, I have shown the strip as making only two complete passes through the electrolyte, but it is to be understood that in actual practice the tank and other parts will be so designed as to cause the strip to make any suitable number of passes through the electrolyte; in some instances several hundred feet of strip material may be immersed in the tank at one time.

Communicating with the bottom of the tank is a circulation pipe 13, through which the electrolyte is fed to an electrolyte reconditioning and heat-exchanging apparatus, of any suitable character, for purifying the electrolyte, restoring it to proper strength and bringing it to the requisite electroplating temperature.

The electrolyte is returned to the tank by way of a pair of spray pipes 14 and a pair of recirculation pipes 15. Spray pipes 14 extend longitudinally of the apparatus and they are joined by a plurality of pairs of perforated pipes 16. The pipes of each pair are disposed either side of the path of travel of strip S and the perforations are directed downwardly at an angle to the horizontal for flushing the strip and cleansing it of any adhering material.

Figure 2:
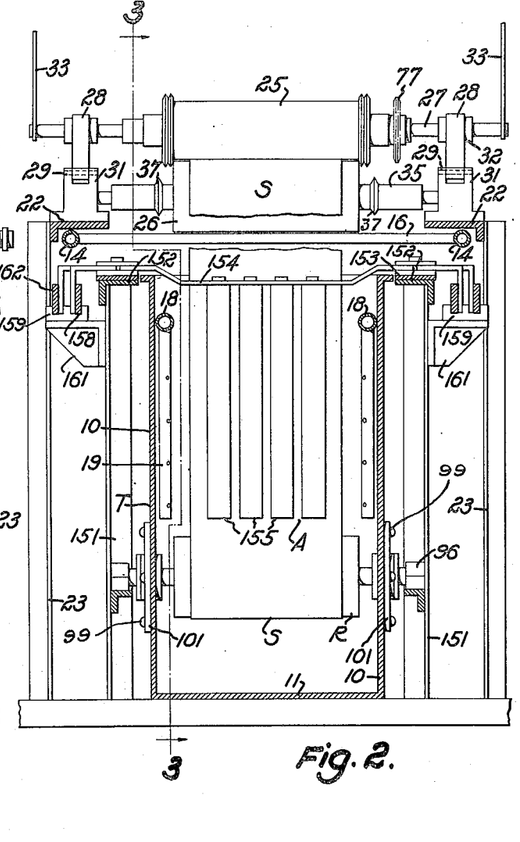
Figure 2 is a vertical sectional view taken along the line 2—2 of Figure 1, looking in the direction of the arrows in this figure; the relative location of the contact roll assemblies, the submerged roll assembly, the anodes, the bus bar assembly and electrolyte conduits are shown.

Pipes 15 are each joined to a horizontal pipe 18 and, as seen in Figure 2, each pipe 18 extends longitudinally on either side of the path of travel of strip S. Joined to pipes 18 at spaced intervals are vertical pipes 19, each having perforations 21 therein that are directed toward the middle of the tank. The electrolyte issuing from openings 21 supplies fresh electrolyte adjacent the anodes and also keeps the body of the electrolyte in the tank in a state of constant agitation.

The contact roll assemblies and other parts of the mechanism are carried upon a pair of horizontally extending angle members 22, which extend longitudinally of the apparatus and rest upon a plurality of vertical supports 23. The mechanism preferably is supported upon the independent framework just described in order that the tank may not be subjected to stresses. The tank may, accordingly, be constructed of wood, concrete, brick, steel, hard rubber, or any other material or combination of materials appropriate for use with the particular electrolyte employed, without special regard for supporting the assemblies and parts. To this end, the bus bars and anodes are also supported upon an independent structure to be hereinafter described.

Contact roll assembly

The contact roll assemblies shown in Figures 1-5, inclusive, are similar in construction and therefore one of them will be described.

Each assembly comprises a contact roll 25 proper, which is mounted for movement to and from an associated strip carrying roll 26.

Figure 1:
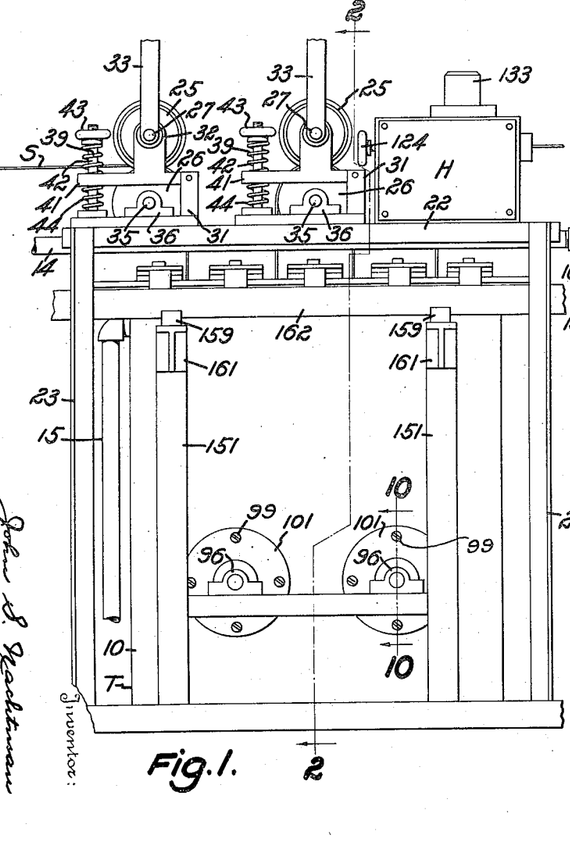
Figure 1 is a side elevational view of an electroplating apparatus embodying my invention.
Figure 4:
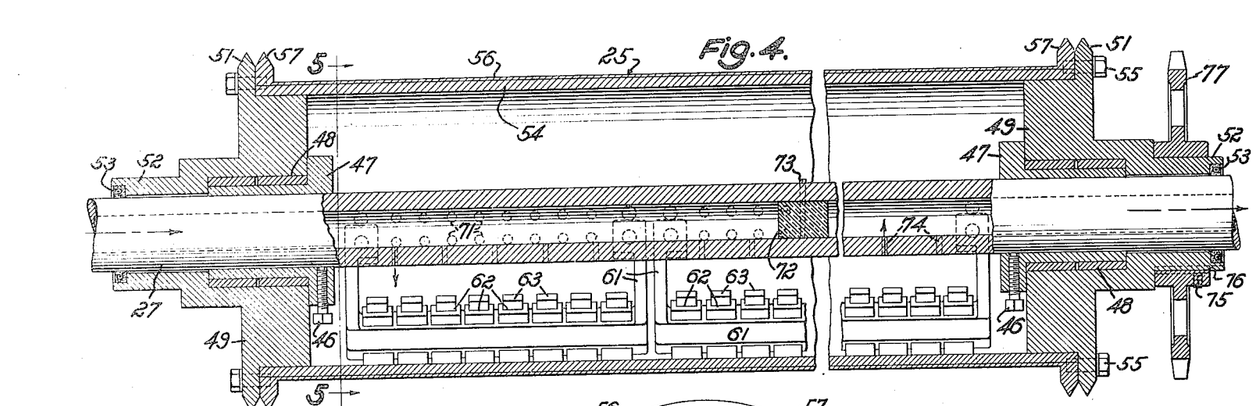
Figure 4 is a longitudinal sectional view through a contact roll that can be employed in the apparatus of Figures 1-3, inclusive.

Referring to Figures 1, 2 and 4, contact roll 25 is journalled on a shaft 27 which is carried, at each end thereof, in an arm 28, which in turn is pivoted at 29 on a support 31, carried by members 22. Shaft 27 is insulated from member 28 by means of an insulating backing 32; and an electrical conductor 33, preferably of flexible design, is connected to the end of shaft 27 for applying a cathode current to shaft 27 and to contact roll 25 in a manner later to be set forth.

The strip carrying roll 26 is preferably made of steel and rubber (flexible) covered in order that it may effect intimate surface engagement between the strip S and the contact roll 25. The provision of a coating or cover that will yield under pressure is an important feature of the present invention; it is preferably an insulating material. However, the invention is not limited to use of such materials as the surfacing of the carrying roll may be constructed of any other material found suitable for the purpose, such as micarta, asbestos, or other materials or combinations of materials. The carrying roll is supported on a shaft 35, which latter is journalled at either end in a bearing 36 carried by the support 31. A slinger 37 is positioned on shaft 35 adjacent each side end of the carrying roll; it functions to keep the electrolyte (with which the carrying roll is coated in normal operation by reason of the strip carrying it out of the tank) from creeping along the shaft and into the bearings.

The contact roll 25 is resiliently urged toward the carrying roll, preferably by means of a compression spring 39 that acts upon an extension 41 of the arm 28. Extension 41 is apertured, and a stud 42, secured to the support 31, extends through the aperture and through spring 39 and has a nut 43 threaded thereon, against which the spring 39 abuts. By adjusting nuts 43 of each contact roll assembly, the strip can be gripped between surface portions of the contact roll 25 and strip carrying roll 26 in contact with the strip with various degrees of compression. A second compression spring 44 is shown on the stud 42 between extension 41 and support 31 for opposing the action of spring 39 and smoothing out the gripping action of the contact roll assemblies.

Figure 5:
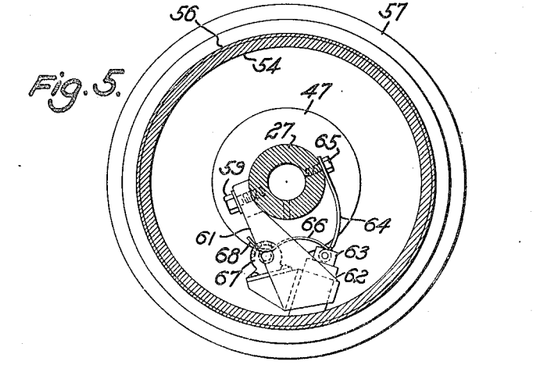
Figure 5 is a transverse sectional view taken on the line 5—5 of Figure 4.

The contact roll 25 is preferably hollow and provided with novel means for conducting the cathode current from the stationary shaft 27 to the roll; Figures 4 and 5 show a construction of the parts.

Secured to shaft 27 by a pair of set screws 46 is a pair of flanged collars 47. Journalled on each collar 47 by means of a bushing 48 is a driven annular-like support member 49 having a slinger 51, and a reduced cylindrical portion 52 terminating in a seal 53; the latter cooperates with shaft 27 to prevent electrolyte from finding its way into the interior of the drum. The drum supports are preferably made of an insulating material, such as micarta or the like. Extending transversely between and joining each pair of members 49 is a cylindrical shell or drum 54; it is secured thereto by a plurality of cap screws 55. Drum 54 is preferably a seamless copper tube, but it may be made, if desired, of other suitable materials without departing from the spirit of the invention. A nickel sleeve surface plate 56 is preferably welded to the periphery of drum 54 and is adapted to directly contact the strip S as it passes between the contact rolls. Fitting tightly over the opposite ends of sleeve 56 and welded thereto is a further pair of slinger rings 57 for throwing the electrolyte clear of the ends of the rollers.

Each contact roll 25, accordingly, is mounted for free rotation on shaft 27. I employ novel totally enclosed brush means for conducting a substantially uniformly-distributed cathode current to the contact roll throughout its length in a manner that now will be set forth.

Secured to shaft 27, by means of cap screws 59, are a plurality of brush support members 61 that may be of cast construction. Each member 61 is provided with a plurality of brush guide openings 62, and brushes 63 are mounted therein to cooperate in direct frictional engagement or contact with the interior of the inner wall or circumferential surface of the drum 54. A flexible brush lead 64 is connected to each brush 63 and is secured to shaft 27 by means of a cap screw 65. Each brush 63 is resiliently urged toward the surface of the drum by means of a leaf spring 66; one end of the spring is coiled within a support 67 carried by member 61 and its free end 68 is adapted to be selectively placed in one of the plurality of slots in support 67, for selectively varying the pressure applied to its brush.

From a consideration of Figures 1 and 5, it is apparent that brushes 63 apply current to the interior of drum 54 in the same region as that where the strip contacts the outside of the drum. Therefore, as brushes 63 are comparatively numerous and are uniformly distributed along the transverse length of the drum, the current path through the drum to the strip is of large cross section and short length, which makes for minimum resistance and current loss and avoids heating of the parts in service.

Another important feature of the contact roll 25 construction just described resides in the fact that the load of carrying the strip is totally absorbed by the carrying roll 26 and no severe stresses are imparted to the contact roll. The pressure exerted upon the contact rolls 25 is that set up by springs 39; in this manner, electrical and driving frictional contact is provided between the roll and the strip. The brush pressure on the inside of the roll 25 tends to counterbalance the strip contact pressure on the outside of such roll.

The contact drum therefore is substantially free from strain under service conditions, and this permits the use of even relatively brittle materials, such as cast alloys and carbon, etc., which are highly resistant to corrosion by electroplating solutions.

The contact roll supports 49 are preferably constructed of an insulating material such as micarta which functions as an insulator to prevent current from passing to the roll by way of the bearings.

In ordinary service, the parts efficiently function at sufficiently low operating temperatures, but in the event that the solutions to be employed are hot, a cooling medium may be circulated through the roll, and in Figure 4 there is illustrated one mode for effecting such a result.

In Figure 4, the shaft 27 is hollow and is provided with a cooling medium inlet at its lefthand end. In the interior of roll 25, the shaft is provided with a plurality of ports 71, through which the cooling medium is adapted to discharge and circulate amongst the brushes in the lefthand end of the roll. A plug 72 of any suitable material is secured within shaft 27, approximately midway of its length, by means of a tapered pin 73, to prevent the cooling medium from flowing freely from one end of the shaft to the other.

The cooling medium may be any desired fluid, such as cold, dry, compressed air, and after it has passed through parts 71 and has abstracted heat from the brushes in the lefthand end of the roll, it circulates amongst the brushes in the righthand end of the roll and is exhausted through a plurality of exhaust ports 74 into the righthand end of the roll and is freely discharged therefrom or through a manifold assembly (not shown) to an air cooler at the suction side of the compressor used.

When it is desirable to operate the contact roll at an elevated temperature as is the case in plating some of the metals (iron, for instance), there is likely to be metallic oxidation formed on the inside of the drum 54, thus causing a high contact resistance between the brushes 62 and the drum 54. I overcome this trouble by injecting a sufficient quantity of a suitable oil (such as Transil oil, also known as GE No. 21, manufactured by the General Electric Company) to submerge the contact area between the brushes 62 and the drum 54. The oil performs two functions. (1) It coats the inside surface of the drum 54, thus excluding air and preventing oxidation of the inside surface of the drum. (2) It also lubricates the sliding contacts between brushes 62 and drum 54 without materially affecting the contact resistance between the brushes and the drum.

The gripping or clamping pressure exerted by springs 39 of the various contact rolls upon the strip may be equal or unequal as desired, depending upon the current to be conducted to the strip and other factors involved. The strip material is looped beneath the submerged rolls in the electrolyte. The latter preferably are constructed in a manner hereinafter to be set forth.

Roll driving means

Figure 6:
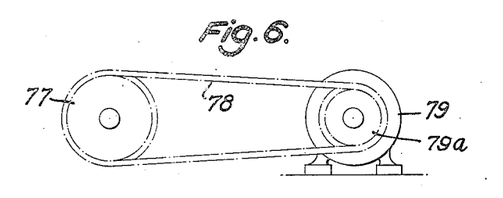
Figure 6 is a diagrammatic view showing a form of driving mechanism for the contact roll assembly, and embodying individual prime movers for each roll.

The various contact rolls, whether they are of equal or unequal diameter, are driven at a synchronous peripheral speed by any suitable means, in order that all parts of the strip material will be smoothly propelled through the bath without any tendency to twist or be placed under tension, and in Figure 6 there is diagrammatically shown one form of means that may be employed to drive the contact rolls.

Secured to the reduced end of drum support member 49, by means of a set screw 75 and a key 76, is a drive sprocket 77; and, referring to Figure 6, sprocket 77 is connected to a sprocket 79a of a drive motor 79 by means of a sprocket chain 78. Each contact roll accordingly is provided with an individual motor 79 for driving it, and the motors are synchronized to insure smooth propulsion of the strip through the bath.

Figure 7:
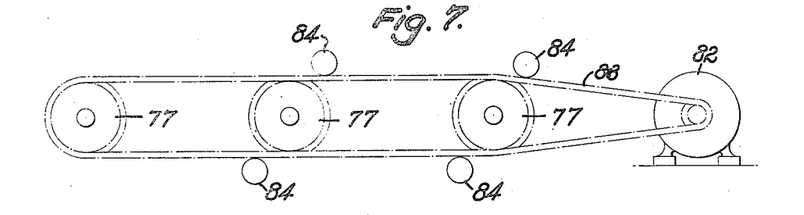
Figure 7 is a diagrammatic view showing a drive mechanism for the contact roll assemblies embodying a single prime mover.

Another form of driving mechanism for the contact rolls is shown in Figure 7. It embodies a single driving motor 82 whose drive sprocket is connected to the sprockets 77 of the contact rolls by means of a sprocket chain 83. A plurality of idle sprockets 84 are employed to maintain chain 83 in continuous engagement with sprockets 77.

Figure 8:
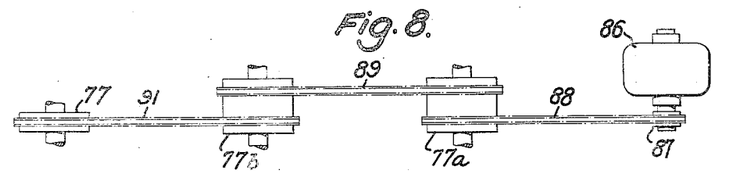
Figure 8 is a diagrammatic top plan view of a further form of drive mechanism for synchronously driving the contact roll assemblies by a single prime mover.
Figure 9:
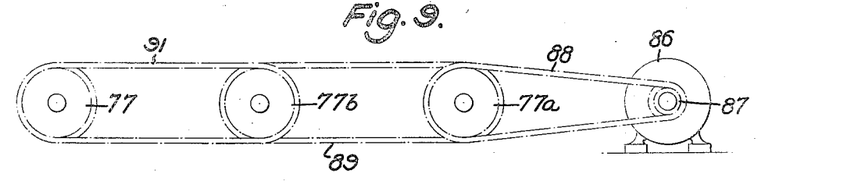
Figure 9 is a side elevational view of the structure shown in Figure 8.

In Figures 8 and 9, there is illustrated a still further form of drive means for the contact rolls; this comprises a single motor or other prime mover 86 having a drive sprocket 87; sprocket 87 is coupled to a double-toothed contact roll drive sprocket chain 88, and another sprocket chain 89 connects sprocket 77a to a second double-sprocket 77b, the latter being connected to sprocket 77 by means of a sprocket chain 91.

In all of the forms of driving mechanisms disclosed, the contact rolls are preferably driven at the same peripheral speed. In those forms where a single prime mover is used, if for any reason it is desired to make some of the contact rolls of smaller diameter than others, the drive sprockets for those rolls will be correspondingly modified to render their peripheral speed equal to that of the other rolls.

Submerged roll construction

Figure 10:
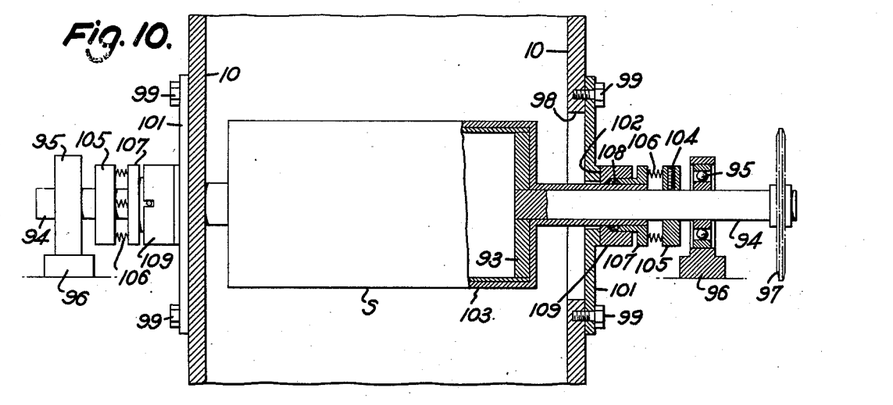
Figure 10 is a vertical sectional view of a preferred form of submerged roll and is taken substantially on the line 10—10 of Figure 1.

The submerged rolls are all preferably of the same construction, and referring to Figure 10, each comprises a steel drum 93 mounted on a shaft 94 which is journalled in bearings 95, carried by supports 96, in order that the load is carried independently of the tank T. A drive sprocket 97 is secured to one end of shaft 94 for driving it; it is preferably coupled by a sprocket chain (not shown) to one of the contact roll sprockets so that it will be driven at the same speed with the contact rolls.

A pair of efficient sealing assemblies are associated with the ends of shaft 94 for preventing electrolyte from leaking from the tank and they are of identical construction.

A pair of face plates 101 are mounted over oppositely-positioned openings 98 in walls 10 of the tank T by means of cap screws 99; each plate 101 has an accurately formed sealing face 102. In order to protect the roll and shaft against corrosion, they are provided with a rubber, or other suitable enclosure or coating 103 that extends transversely beyond face plates 101. A collar 105 takes the reaction of a plurality of compression springs 106 and is secured to each end of the shaft 94, by means of a set screw 104. Springs 106 act against a packing washer 107 which in turn acts upon a packing element 108 and a seal seat member 109. Springs 106 are adjusted to exert sufficient pressure upon washer 107 to cause member 108 to effect a fluid-tight seal between it and the coating 103 of shaft 94. Springs 106 also exert sufficient pressure to cause the inner face of member 109 to establish a fluid-tight seal between it and face 102 of plate 101. The pressure may be adjusted from time to time by loosening one or both set screws 104 and moving the corresponding collar or collars 105 in or out along shaft 94 to increase or decrease the pressure.

Combined squeegee and centering roll assembly

In feeding strip material continuously, there is a possibility of camber or misalignment in the strip after the component parts thereof have been welded or otherwise joined together. Where such a strip is propelled through a plating tank, it will have a sidewise motion and will be damaged if its edges come into contact with the stationary parts of the plating machine; an uneven electrodeposition will occur and the tank, itself, undergo damage. Accordingly there is provided in the apparatus of the present invention a novel strip guiding or centering device which is fully automatic in operation and insures against the disadvantages just discussed.

Referring more particularly to Figures 3 and 11–14, inclusive, a pair of squeegee rolls 111 and 112 are journalled on a base 113; the latter is mounted for rocking movement in trunnion 114 on a stationary support 115. The other end of the rocking support 113 is guided in a frame-like, stationary member 116, which engages opposite edges 117 and 118 of frame 113, see Figure 13; roll 112 is journalled in the lefthand portion of base 113 at 120.

Roll 111 is journalled at 119 in a pair of arms 121, which are pivoted at 122 to base 113. A screw 123, actuated by a hand wheel 124, is threaded into base 113 and acts upon a pair of compression springs 125 to apply pressure to pivot arms 121, for gripping the strip between the squeegees under selectively variable degrees of pressure.

Squeegee rolls 111 and 112 are disposed in a side-by-side relationship in housing H (see Figure 1), above the tank T, in order that electrolyte squeezed from the surface of the strip will freely gravitate back into tank. In order to prevent electrolyte from working along the shafts supporting the rolls and finding its way to the bearings, each shaft is provided with a pair of slingers 127. The shafts for rolls 111 and 112 are provided with intermeshing gears 128 and 129, respectively, that are actuated by a chain driven sprocket 131 carried by the shaft of roll 112. Sprocket 131 may be driven to give rolls 111 and 112 a peripheral speed equal to that of the other rolls by a synchronously driven motor, as shown in Figure 6 of the driving arrangements.

I also preferably associate the novel centering means or strip guiding means of my invention with the squeegee rolls, but it is to be understood that, if desired, it may be associated with one of the contact roll assemblies or may be duplicated and be applied to two or more of the contact roll assemblies and/or the submerged rolls.

Means, actuated by the lateral movement of the strip material are provided for causing base 113 to be rocked about its axis 114 in the proper direction to cause the moving strip to be restored to the proper direction of travel. To this end, a unitary electric motor and gear box assembly 133 is mounted on stationary frame member 116 and provides a driving connection between the motor and a pair of guide screws 134 which are journalled in frame 116. Screws 134 are threaded into spaced frame portions 135 and 136 of base 113, see Figure 13; the arrangement being such that rotation of the motor (which is reversible) will effect synchronous rotation of screws 134 and thereby cause the lefthand end of base 113 (Figures 11 and 12) to be raised or lowered depending upon the direction of rotation, effecting rocking movement of the entire assembly about pivot 114 as an axis.

Figure 11:
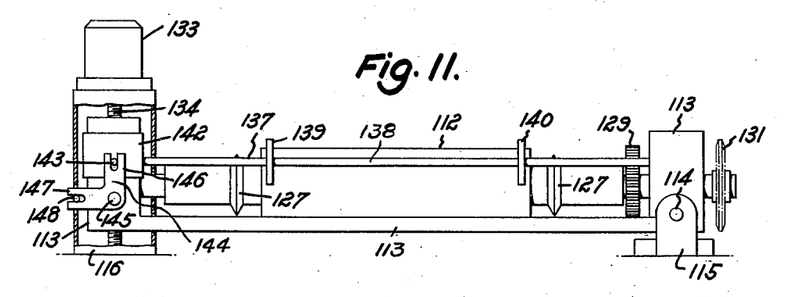
Figure 11 is a side elevational view, with parts broken away, of a combined squeegee roll and strip centering roll assembly.
Figure 12:
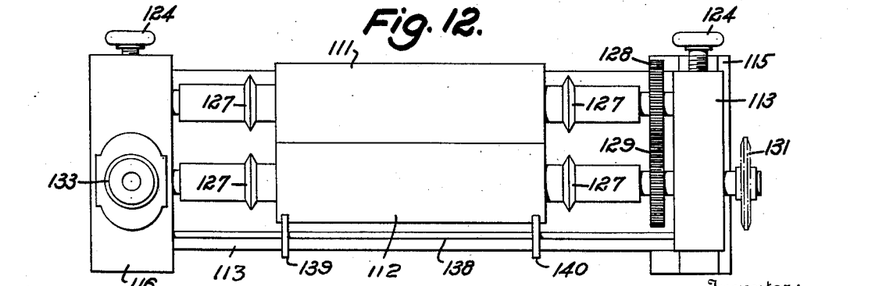
Figure 12 is a top plan view of the structure shown in Figure 11.
Figure 13:
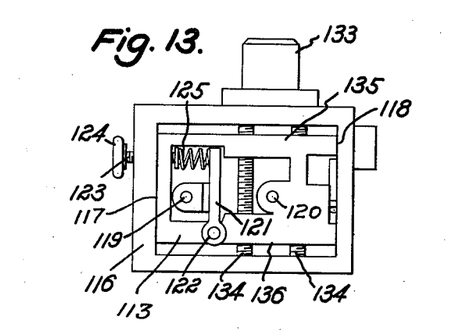
Figure 13 is a view in elevation looking at the left hand end of the structure shown in Figure 11.

The circuit for motor 133 is automatically controlled by a rod 138 that carries a lefthand finger in the form of a plate 139 and a righthand finger in the form of a plate 140. Rod 138 is mounted for reciprocating movement parallel to the axis of the rolls in base 113 and fingers 139 and 140 are adapted to be contacted by the side edges of the strip material in its passage through the rolls. Contact of the strip with finger 139 will effect a movement of rod 138 to the left, whereas contact of the strip with finger 140 will effect a righthand movement of the rod. The movements of the rod just described are employed to close the circuits in a limit switch assembly designated as 142, see Figure 11, into whose housing the rod 138 projects. Switch 142 is mounted for movement as a unit in a direction parallel to that of rod 138 and its housing is provided with a pin 143. A bell crank lever 144 is pivoted on base 113 at 145, and is provided with a bifurcated end 146 which embraces this pin 143 and a bifurcated end 147 which embraces a pin 148 carried by stationary frame member 116. The arrangement of the parts is such that downward movement of the rocking base 113 will effect clockwise rocking movement of lever 144 and will move switch 142 to the right (Figure 11). Upward movement of base 113 within frame 116 will effect counterclockwise movement of lever 144 and movement of switch 142 to the left.

Summarizing the operation of the centering mechanism, and assuming that the strip is being fed through the apparatus and is traveling too far to the right, its edge contacts finger 140 and moves rod 138 to the right, which in turn causes switch unit 142 to energize motor 133 in a direction to cause screws 134 to effect a downward movement of base 113. This movement of base 113 rotates lever 144 in a clockwise direction, causing switch unit 142 to be moved to the right until it reaches a point where it will break the circuit and shut down the motor. The purpose of movably mounting the limit switch 142 or other detecting device is to prevent overcorrection of the roll position, which would result in an oscillating motion being imparted to the straight portion of the strip after the cambered part had passed.

Although I have shown a particular form of automatic electric controlled centering mechanism, it is to be understood that the invention is not limited thereto because, if desired, the limit switch may be replaced by movably mounted photoelectric equipment; or, a movably mounted "Pliotron" elevator leveling unit; or, by several photo-electric or leveling units, rigidly mounted, but having relay circuits to give an effect somewhat similar to that of a movable mounting. Also, while a reversing motor has been shown, a non-reversing motor having suitable clutches and reversing gears controlled by the lateral movement of the strip may be substituted, if desired. It is to be understood, moreover, that the invention is not limited to electromagnetic means; a pneumatic or hydraulic piston and cylinder or diaphragm assembly may be employed to actuate base 113, and it may be controlled by the lateral movement of the strip in a manner similar to that described in connection with an electro-magnetically actuated embodiment of the invention.

Figure 14:
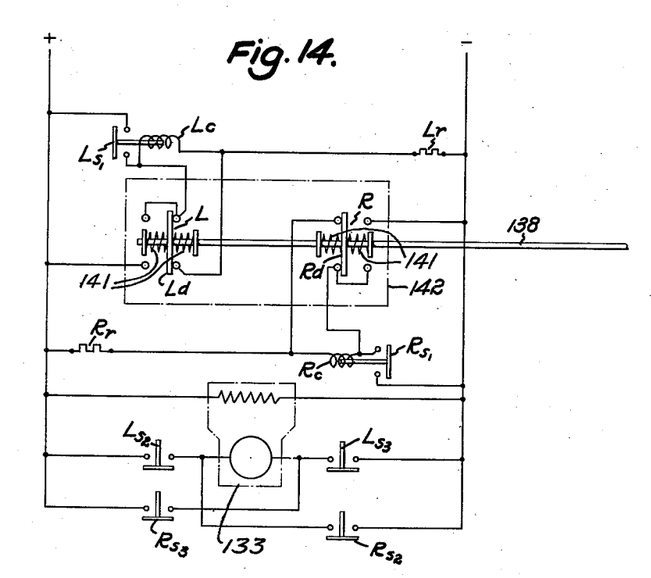
Figure 14 is a diagrammatic view of the electric circuit and the electric units employed in the structure of Figures 11-13, inclusive.

With more particular reference to Figure 14, a suitable circuit is shown embodying the reversible motor 133 and its controlling unit or limit switch 142; the armature and field of the motor are connected independently, as illustrated, across a line which preferably carries direct current under proper voltage. The armature has reversible connections which determine its direction of rotation, depending upon the positions of a plurality of automatic switches $R_{s2}$, $R_{s3}$, $L_{s2}$ and $L_{s3}$. When the R switches are closed and the L switches are open, the armature turns in one direction; and upon closure of the L switches and opening of the R switches the direction of rotation is reversed. The R switches are operably connected for closure simultaneously with a switch $R_{s1}$ when a coil Rc is energized; and the L switches likewise are operably connected with a switch $L_{s1}$, and are actuated by a coil Lc. Normally, that is, when the strip is running true, all of the switches and a limit switch 142 occupy the positions illustrated in Figure 14.

The switch 142 embodies a pair of double contact switches R and L comprising spaced pairs of contacts cooperating, respectively, with contact discs Rd and Ld which are carried by, and shiftable axially with, the strip-actuated rod 138. The discs, however, are movable slightly in both directions along the rod against any suitable yielding means such as compression springs 141 that are designed to normally urge the discs to definite positions relative to the rod, such positions being illustrated in Figure 14.

The contact elements of the switches R and L are associated with the respective coils, Rc and Lc, in such a manner that, in the position illustrated in Figure 14, both coils are short-circuited and hence de-energized and the motor 133 is stationary; that in one direction of movement of the rod 138 (righthand), the coil Rc is energized while the coil Lc remains shorted; and that in the other direction of movement of rod 138 (lefthand), the coil Rc becomes short-circuited and the coil Lc energized. Suitable current adjustment resistors Rr and Lr are interposed in the respective branches of the circuit.

Assuming that the rod 138 has been moved to the right through contact of the strip with finger 140, this will open the normally closed contacts and close the normally open contacts of switch R, thus energizing the motor in such a way as to drive the lefthand end (Figures 11 and 12) of base 113 downwardly on screws 134. Downward movement of the left portion of base 13 causes the limit switch unit 142 to be shifted to the right through the action of lever 144 and this will reopen the normally open contacts and reclose the normally closed contacts of the switch R. Reclosing the normally closed contacts will short circuit the coil Rc, thus de-energizing the coil and stopping the motor. Should the strip continue to shift to the right after the cycle of operations just described has been completed, the entire sequence of action will be repeated until the roll assembly has been lowered sufficiently to counteract the misaligning tendency of the camber of the strip.

When the cambered part of the strip has passed the squeegee roll assembly, the strip will feed to the left because the lefthand end of the roll assembly is lowered as the result of the operation previously described. The strip will then engage finger 139 and carry rod 138 to the left. This will energize the motor by means of the limit switch unit L in a manner similar to that previously described except that the direction of the rotation of the motor will be reversed so as to effect upward movement of the lefthand end of base 113. This in turn will cause the limit switch unit 142 to be shifted to the left to stop the motor and arrest upward movement of base 113. Should the strip continue to feed to the left, the sequence of operations will be repeated until the sidewise motion of the strip has been corrected. The manner of correction for movement of the strip to the left of its true center position is thought to be obvious in view of the above, and hence is not explained in detail. It is therefore apparent that the feed of the strip is automatically and accurately controlled at all times without overcorrection and without feeding the strip past a center position.

Anode and bus bar construction

Figure 3:
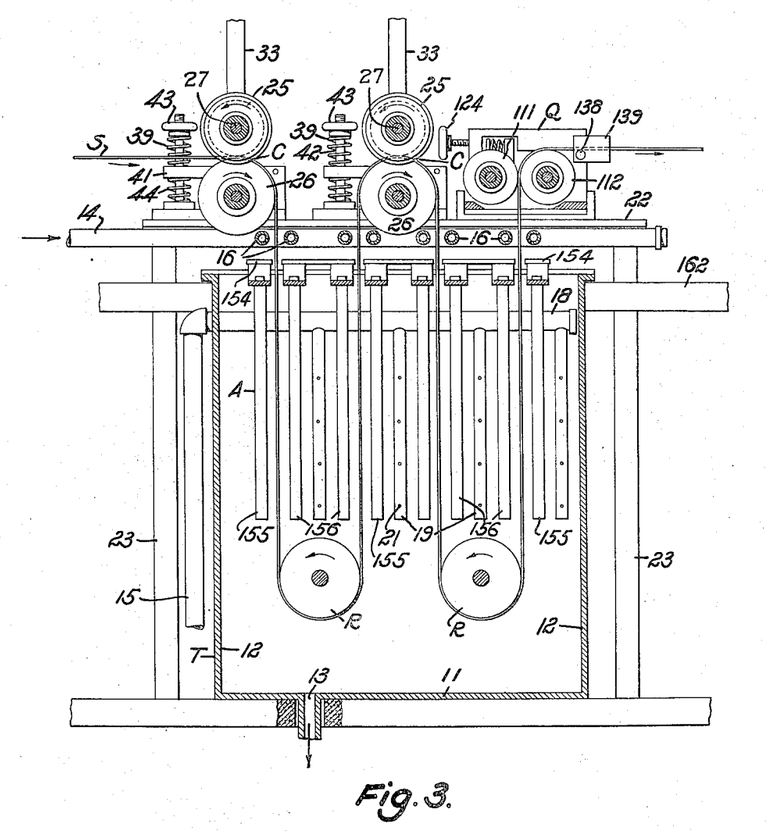
Figure 3 is a vertical longitudinal sectional view taken substantially along the line 3—3 of Figure 2, looking in the direction of the arrows.

Referring more particularly to Figures 2 and 3, a secondary framework having uprights 151 and horizontally disposed angle members 152 is employed to support the bus bar and anode assembly as follows: Supported on an insulator assembly 153 and carried by members 152 at each side of the tank are a plurality of transversely-extending anode supports 154 that extend across the tank as shown in Figure 2. A plurality of anode bars 155 and 156 are secured to supports 154 and are submerged in the electrolyte. As seen in Figure 3, anodes 155 are located adjacent the downwardly (outer) facing portions of the loops formed by the strip material in the electrolyte and they therefore operate to effect electroplating of the under side of the strip material. Electrodes 156 on the other hand are disposed within the upwardly (inner) facing loops of the strip material and electroplate the upper surface of the strip material. The two groups of anodes preferably are electrically segregated in order that a heavier plating current can be applied to one group or the other to effect a heavier electroplate on one surface of the strip.

Supports 154 for electrodes 155 accordingly are connected at each side of the tank to a bus bar 158 carried in a plurality of insulators 159 which are in turn carried by a plurality of brackets 161 secured to supports 151. Supports 154 for electrodes 156 extend outwardly beyond bus bars 158 and are connected to bus bars 162 which also are carried by insulators 159.

*Modified contact roll*

Figure 15:
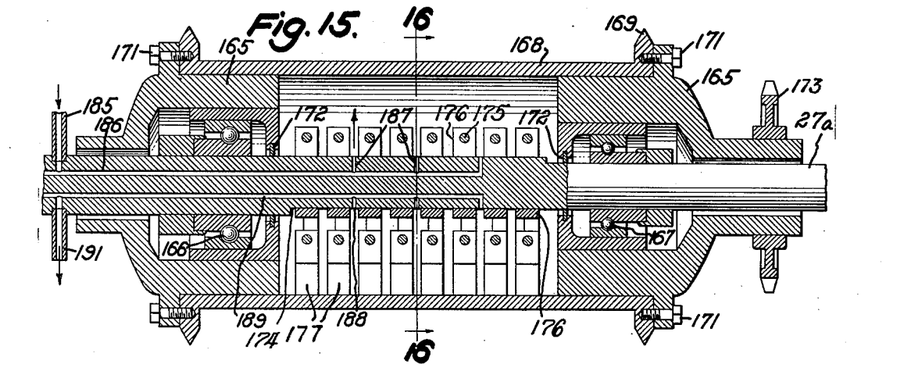
Figure 15 is a longitudinal sectional view similar to Figure 4, but illustrating a modified form of contact roll of the invention.

In Figure 15, a modified form of contact roll is shown, the major differences between it and the previously described form residing in the fact that the brushes are pivoted rather than slidable in their holders, that a modified cooling arrangement is used, and that anti-friction bearings are used.

A pair of annular-like, spaced-apart drum supports 165 are journalled on bearings 166 and 167 on shaft 27a; and, a cylindrical drum shell 168 having integral slingers 169 is secured to the drum supports by a plurality of cap screws 171. A pair of sealing assemblies 172 are associated with drum supports 165 and cooperate with shaft 27a for preventing lubricant from leaking from the bearings into the brushes. A drive sprocket 173 is mounted on one of the drum supports for imparting rotation thereto.

Figure 16:
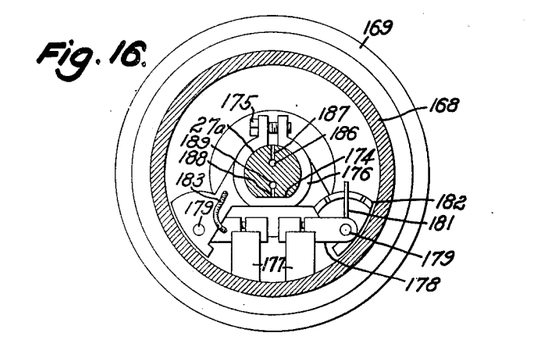
Figure 16 is a transverse sectional view taken on the line 16—16 of Figure 15, looking in the direction of the arrows.

Shaft 27a is provided with a flat-sided lower surface 174, see Figure 16, that extends as shown in Figure 15. Firmly clamped to shaft 27a by means of screws 175 are a plurality of brush supports 176. Each brush support carries a pair of brushes 177 which cooperate with the inner surface of the drum. Each brush is carried by an arm 178 pivoted at 179 on the brush support, and is urged toward the drum by torsion springs 181. The brush supports also embody notched sectors 182 so that the brush pressure may be adjusted by placing the free ends of the springs in the appropriate notches to give the requisite pressures. In order to prevent pivots 179 from carrying current, a flexible shunt cable 183 is connected directly to each brush through the brush support.

The current is supplied to shaft 27a by a flexible conductor in a manner similar to that shown and explained in the embodiment of my invention disclosed in Figures 4 and 5. The contact roll is also preferably cooled by a fluid medium which enters a conduit 185 at one end of shaft 27a, passes through a longitudinally extending bore 186, and is exhausted through a plurality of ports 187 provided in shaft 27a. The cooling medium may be dry, cold, compressed air; it passes downwardly in the roll along both sides of the shaft 27a and abstracts heat from the brushes and their associated parts. The heated air is exhausted from the roll by way of a plurality of exhaust ports 188 which communicate with a longitudinal passage 189 provided in the shaft; passage 188 communicates with a discharge conduit 191.

In view of the fact that in this form of the invention the brushes are completely enclosed and protected against the action of the electrolyte, they are arranged substantially uniformly along the axis of the roll; and they are urged outwardly against the inner surface of the roll in the region where the outer surface thereof contacts the strip under a pressure that is substantially equal to the contact pressure of the roll with the strip. Therefore, all of the advantages of the previously described form of contact roll are achieved.

Figure 17:
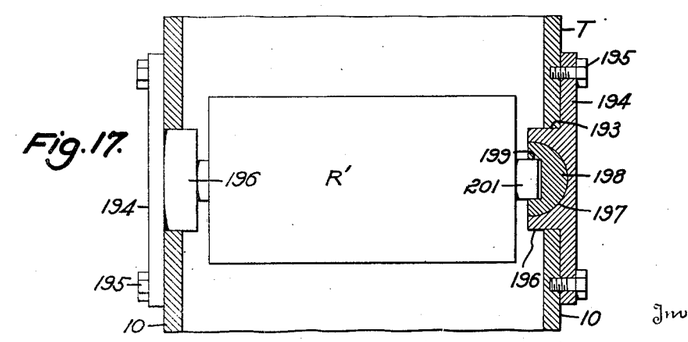
Figure 17 is a view similar to Figure 10, but illustrating a modified form of submerged roll of the invention.

In Figure 17 of the drawings, I have illustrated a modified form of submerged roll assembly, the major difference between it and the previously described form of roll residing in the fact that it is designed to idle in response to the pulling of the strip material under it. Each wall 10 is provided with an opening 193, and a plate 194 is secured to wall 10 by means of cap screws 195 and is provided with a boss 196 which extends into opening 193. Each boss is provided with a hemispherical socket or bearing 197; and, cooperating in self-aligning relationship therewith is a bearing member 198 having a socket 199 in which the shaft portion 201 of roller S' is journalled. It is accordingly apparent that as all of the moving parts of roller S' are located within the tank, and as members 194 fit in a tight sealing arrangement with the tank, there is no possibility of the electrolyte escaping therefrom.

Figure 18:
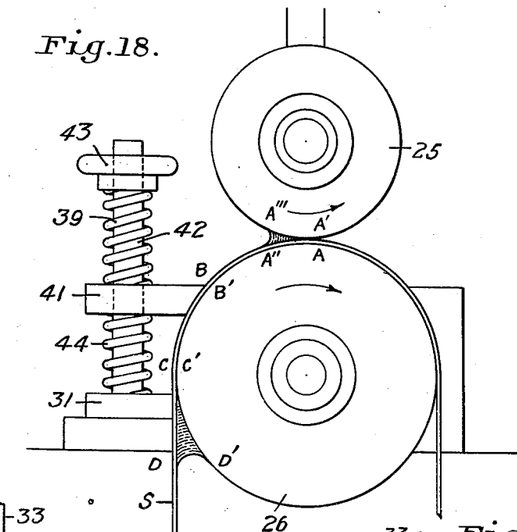
Figure 18 is an enlarged side view in elevation somewhat diagrammatically showing a contact roll assembly.

In Figure 18, I have somewhat diagrammatically illustrated an important principle or feature of the present invention. It will be noted that the contact roll 25 has a somewhat smaller size or diameter than the non-conducting carrying roll 26. I will briefly describe the pertinency of this particular type of arrangement.

For the purpose of my discussion, let it be assumed that the roll 26 is an ordinary conductor roll and that the upper roll 25 is omitted. The direction of rotation of the roll 26 is shown by the arrow. I have found that a considerable pocket of the electrolytic solution is collected and held at the point where the strip S approaches the roll. This pocket of solution may be represented by the area marked CC'—DD'. The size of the pocket of solution increases substantially in direct proportion to the speed at which the strip travels and the difficulties encountered are increased as the speed increases, because more solution is trapped in the pocket at higher speeds.

The current passes from the anodes to the strip S (cathode) carrying metal from the anodes and depositing it on the strip. Current then flows through the strip S towards the assumed contact roll 26, and at D, the current begins to divide, some of it going through the path represented as DD', CC', BB', AA'. The amount of current through any path is in an inverse proportion to its resistance, and thus, the current will divide up in multiple paths according to the resistance of each. It will be noted that contact roll pressure between the strip S and the assumed contact roll 26 is substantially zero up to the point CC' and that such pressure increases between C and A. The value of the contact pressure is determined by the tension in the strips. If the tension is relatively low, the points CC' at which the contact pressure is substantially zero, will move towards AA' and thereby increase the area that is bounded by CC'—DD'. For example, if the tension is at a low value of approximately 5 pounds per inch of width per strip, a film of plating solution will be carried completely around the assumed contact roll 26; any current passing from the strip S to the contact roll will pass through the film of solution, with the result that the strip, itself, acts as an anode and metal is carried from the strip and deposited on the contact roll.

Heretofore, it has been necessary to employ a relatively high strip tension to provide a good contact pressure between the strip and the contact roll; the employment of a high tension, however, does not entirely eliminate the plating effect and some current will pass through the solution pocket bounded by CC'—DD', plating the contact rolls. Thus, they must be periodically cleaned. Of course, the amount of plating will depend upon the resistance of the path through the pocket of solution as compared with the resistance of the path through the strip and then to the contact roll above the line CC' as indicated at BB'. For instance, if the strip is of very thin metal, the resistance of the path DD' may be as low as the path DBB', resulting in an appreciable amount of current through the pocket of solution; a rapid plating of the contact roll follows.

I have been able to overcome the disadvantageous features of the contact roll arrangements known to the art by a novel arrangement of rolls such as indicated somewhat diagrammatically in Figure 18. As previously explained, the bottom roll 26 is preferably non-conducting; therefore, although there will be an accumulation of liquid between S and 26, as at D—D' and a film of liquid will be carried over the roll, no current will pass and there will be no deposit on 26. There will, however, be an accumulation of liquid between roll 25 and strip S at A''—A'''. It will be noted, however, that the length of contact of 25 with the strip in the direction of motion, is very short, because the strip does not wrap around 25; and the smaller the roll 25, the shorter the arc of contact. By employing as small a diameter of contact roll as practicable, the length of the wedge of accumulated liquid between the contact roll and the strip is made as small as possible. In addition to the shortening of this wedge, the amount of current passing through it is further reduced by the pressure of the contact roll 25 against the sheet S being very much greater per unit area than the average pressure of the sheet S against the roll 26, where the arc of contact is very long. The conductivity between S and 25, at the line of maximum pressure, is therefore high, and the contact so good that practically no current passes through the wedge of liquid and there is no plating of the roll 26 and no injury to the plating on strip S. By employing a relatively small contact roll, I obtain a relatively large unit area of pressure without the necessity of increasing strip tension.

It will be noted that the pressure between the strip S and the contact roll 25 is independently adjustable, and thus, independent relative to the tension of the strip; the result is that the strip can be operated at a very low tension and at the same time the contact roll can be pressed against the strip with sufficient pressure to give a high electrical efficiency, providing a good path for the current to pass directly from the metallic strip to the metallic contact roll.

Figure 19:
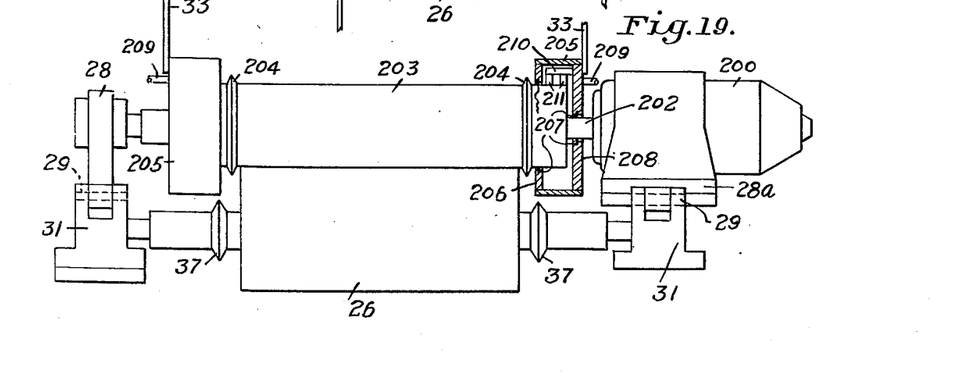
Figure 19 is a longitudinal view in elevation of a modified form of contact roll.

In Figure 19, I have shown modified forms of contact roll assemblies. Referring particularly to the embodiment of Figure 19, I provide current-carrying brushes adjacent opposite ends of a contact roll 203 that is preferably of metal construction and may be solid, if desired. A motor 200 is mounted on a rocker arm 28a which is pivoted at 29 to a support 31. The motor 200 is directly connected by a shaft 202 to the contact roll 203. The other end of the contact roll is journalled in and supported by a rocker arm 28 pivotally mounted in support 31. It will be noted that the support structure for the contact roll 203 is substantially the same as that previously explained in connection with the embodiment of my invention shown, for example, in Figures 1-3, inclusive.

Brush housings 205 are preferably non-rotatably mounted over opposite end portions of the contact roll 203; means 207 is interposed between the housings 205 and the contact roll for sealing off the inside portions of housing and permitting relative rotation. Each protective housing 205 has a front wall portion 206 and a back wall portion 208. Cooling fluid may be introduced into and exhausted from the housing through suitable ports 209. Brushes 211 are mounted on a brush holder 210 that is suitably secured to the inside of the housing 205, making electrical connection with bus bar 33. I have also shown suitable slingers 204 adjacent opposite ends of the roll 203.

It will be apparent to those skilled in the art that the contact rolls of my invention can be employed with advantage in place of contact rolls heretofore used in the art, but that I prefer a roll pair combination such as 25 and 26, in order to incorporate other important features of my invention. However, if a contact roll is employed without a strip carrying roll, I prefer to keep the diameter of the contact roll as small as possible; e. g., a single roll may be used in electrocleaning.

Although I have illustrated the invention in connection with the electroplating of strip material in the form of steel or other metallic sheets, it is to be understood that the novel features thereof are applicable to the electroplating of wire, cable, chain and elongated shapes and/or articles. The appended claims therefore embrace my invention as applied to any suitable form of material, designated, generally, as "strip." Moreover, the invention may be carried out by other suitable and/or modified apparatus. For example, the squeegee roll support has been illustrated as being mounted for rocking movement about a horizontal axis, but, if desired, it may be mounted for rocking movement about a vertical axis and the actuating means and control mechanism therefor modified to effect proper centering of the strip. Also, rod 138 and fingers 139 and 140 have been illustrated as being carried by the squeegee roll support 113, but, if desired, they may be so disposed as to cooperate with the strip in a region other than adjacent the squeegee roll assembly. For instance, they may be located adjacent one of the contact rolls if desired without departing from the spirit of my invention so long as movements of the squeegee roll support are suitably correlated therewith to effect a control similar to that effected by the mechanism of Figures 11 to 14, inclusive.

Referring to the novel contact roll assemblies of the invention, they likewise may be embodied in equivalent forms without departing from the spirit of the invention. For instance, the brushes may be secured to the inner surface of the drum and may cooperate frictionally with the stationary shaft. Also, I have illustrated the cathode current carrying roll as constituting the roll that is movable toward and away from the carrying roll under the influence of spring pressure, but it is to be understood that the relationship may be reversed and the carrying roll be movably mounted and resiliently urged upwardly toward the novel current carrying roll constructions of the invention. Also, the roll that has been referred to as the carrying roll may embody the novel enclosed brush combination of my invention.

The cooling apparatus is especially advantageous where excessive heat is encountered. The use of the cooling system is also advantageous, because, by suitably regulating the input and output pressures of the cooling medium, a positive pressure may be maintained in the contact roll during operation such that corrosive fumes and gases evolved from the electrolyte will be prevented from creeping along the shaft and attacking the bearings.

The novel contact roll assembly of the invention effects an improved method of applying the cathode current to the moving strip, because the thin and highly conductive shell constituting the drum makes a line contact with the strip to be plated, and because the brushes bearing against the interior of the shell along a line in approximate super-position with the line of contact of the shell with the strip insures a uniformly-distributed current throughout the length of the roll, with a resistance path of minimum length and with the total brush pressure substantially equal to the total pressure of the roll upon the strip. As a result, the shell is subjected to a minimum of distorting stress throughout the operation.

I claim:

1. In apparatus for electroplating metal strip material including a tank having an electroplating bath therein in which bath the strip is to be electroplated, roll means for directing the strip through said bath including a plurality of pairs of upper rolls between which the strip is adapted to move, a roll submerged in the electroplating bath for each pair of upper rolls for guiding the strip from one pair of upper rolls to the next pair of upper rolls, means for propelling the strip through the electroplating bath, one of the rolls of each pair being a contact roll for conducting electroplating current to the strip, the other roll of each pair being a non-conductor carrying roll around which the strip wraps in passing to and from the submerged rolls, each contact roll being smaller in diameter than its associated carrying roll, and adjustable means for each pair of upper rolls resiliently pressing the contact roll of said pair toward its associated carrying roll for gripping the strip between surface portions of the contact and carrying rolls and for effecting intimate surface contact between each contact roll and the strip; whereby electrical contact is provided between the contact rolls and the strip by the contact roll pressure against the strip independently of strip tension, whereby the strip may be propelled under very low tension without slippage between the strip and roll means, and whereby the electroplating current is efficiently and uniformly conducted to the strip without high strip tension and without any material deposition of plating metal on the contact rolls.

2. In apparatus as defined in claim 1, means for driving each contact roll of each pair for propelling the strip through the electroplating bath, and means for synchronously driving said contact rolls to impart the same peripheral speed thereto.

3. In apparatus as defined in claim 1, the submerged rolls guiding the strip in substantially vertical reaches to and from the contact rolls, a plurality of electrodes in said tank adjacent vertical reaches of the strip, there being at least one electrode adjacent one surface of the strip and at least one other electrode adjacent the opposite surface of the strip of each of said reaches, and means including an electric circuit connected with said one electrode for each reach and another electric circuit connected with said other electrode for each reach constructed and arranged for applying electroplating current to one side of the strip independently of the other side of the strip in such manner as to control the electroplate applied to each side of the strip.

4. In an apparatus for electroplating metal strip material including a tank having an electroplating bath therein in which bath the strip is to be electroplated, a rotatable submerged roll disposed in said tank for guiding the strip material below the level of the electroplating bath, journal means outside said tank, said roll having a shaft portion extending through an opening provided in the side wall of said tank and journaled in said journal means; an annular, axially-facing sealing face provided on said tank adjacent to and concentric with said opening; a ring-like sealing unit secured on the shaft portion for rotation therewith between said sealing face and said journal means, said unit including a packing element rotating with the shaft forming a fluid-tight seal between the unit and shaft portion, and said unit also including a sealing face frictionally cooperating with the tank sealing face to provide a fluid-tight seal thereat.

5. In apparatus as defined in claim 4, said ring-like sealing unit being mounted for axial sliding movement upon said shaft portion, and resilient means urging said packing element and the sealing face of the unit, respectively, into sealing engagement with the shaft portion and tank sealing face.

6. In an apparatus for electroplating metal strip material including a tank having an electroplating bath therein in which bath the strip is to be electroplated, roll means for directing the strip through said bath including a pair of upper rolls between which the strip is adapted to move, means for driving the roll means for propelling the strip through the electroplating bath, one of the rolls of said pair being a contact roll provided with a current conductive portion, the other roll of said pair being a non-conductor carrying roll, said contact roll having a surface of said current conductive portion in physical contact with the strip for conducting electroplating current to the strip, current-carrying means having brushes directly contacting and supplying electroplating current to a surface of said current conductive portion of said contact roll, and means extending circumferentially of said contact roll enclosing and sealing said brush means from the surface portion of said contact roll which is in physical contact with the strip.

7. In apparatus as defined in claim 6, said contact roll including a shaft, said driving means including a motor directly connected to said shaft, said brush means directly contacting an outer circumferential surface of said contact roll, and said sealing means including a housing around an outer portion of said contact roll.

JOHN S. NACHTMAN.